(12) United States Patent
Uchida et al.

(10) Patent No.: US 9,976,626 B2
(45) Date of Patent: May 22, 2018

(54) TORSIONAL VIBRATION REDUCTION DEVICE FOR TORQUE CONVERTER

(71) Applicant: TOYOTA JIDOSHA KABUSHIKI KAISHA, Toyota-shi, Aichi-ken (JP)

(72) Inventors: Keisuke Uchida, Nagoya (JP); Yoshinori Shibata, Nagoya (JP); Hiroyuki Fujii, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days. days.

(21) Appl. No.: 15/261,125

(22) Filed: Sep. 9, 2016

(65) Prior Publication Data

US 2017/0074349 A1    Mar. 16, 2017

(30) Foreign Application Priority Data

Sep. 14, 2015 (JP) ................................. 2015-181243

(51) Int. Cl.
  *F16F 15/14* (2006.01)
  *F16F 15/30* (2006.01)
  *F16H 45/02* (2006.01)

(52) U.S. Cl.
  CPC ............ *F16F 15/145* (2013.01); *F16F 15/30* (2013.01); *F16H 45/02* (2013.01); *F16H 2045/0205* (2013.01); *F16H 2045/0231* (2013.01); *F16H 2045/0278* (2013.01)

(58) Field of Classification Search
  CPC . F16F 15/145; F16F 15/30; F16H 2045/0205; F16H 2045/0231; F16H 2045/0278
  See application file for complete search history.

(56) References Cited

U.S. PATENT DOCUMENTS

| | | | | |
|---|---|---|---|---|
| 5,295,411 A | * | 3/1994 | Speckhart | F16F 15/14 74/574.3 |
| 6,280,330 B1 | * | 8/2001 | Eckel | F16F 15/13142 464/3 |
| 6,382,050 B1 | * | 5/2002 | Carlson | F16F 15/145 464/24 |

(Continued)

FOREIGN PATENT DOCUMENTS

| | | | | |
|---|---|---|---|---|
| DE | 10005543 A1 | 8/2001 | | |
| DE | 102004039905 A1 | * | 3/2005 | ............ F16F 15/131 |

(Continued)

*Primary Examiner* — Vicky A Johnson
(74) *Attorney, Agent, or Firm* — Oliff PLC

(57) ABSTRACT

A torsional vibration reduction device provided inside a torque converter includes rolling elements, a plate, and a cover. The plate includes rolling chambers housing the rolling elements. The cover encloses and shields the rolling elements and the plate from a working fluid surrounding the torsional vibration reduction device inside the torque converter. The cover includes first and second covers that are joined together with the plate held between the first and second covers. The first and second covers contact the plate in an axial direction of the torque converter at locations that are, with respect to an axis of the torque converter, on an inner peripheral side and on an outer peripheral side of the rolling chambers. Surfaces of the first and second covers are joined to the plate at least at part of the locations where the first and second covers contact the plate.

6 Claims, 8 Drawing Sheets

(56) References Cited

U.S. PATENT DOCUMENTS

| | | | | |
|---|---|---|---|---|
| 2013/0186724 A1* | 7/2013 | Miyahara | .............. | F16F 15/145 |
| | | | | 192/3.23 |
| 2014/0221106 A1* | 8/2014 | Jimbo | ................ | F16F 15/1397 |
| | | | | 464/45 |
| 2014/0374207 A1* | 12/2014 | Amano | ................ | F16F 15/145 |
| | | | | 192/3.28 |
| 2015/0005078 A1* | 1/2015 | Sekiguchi | ............... | F16H 45/02 |
| | | | | 464/24 |
| 2015/0377320 A1* | 12/2015 | Miyahara | .............. | F16F 15/145 |
| | | | | 188/378 |
| 2015/0377332 A1* | 12/2015 | Miyahara | ............... | F16H 45/02 |
| | | | | 192/3.28 |
| 2016/0053878 A1* | 2/2016 | Amano | ................... | F16H 45/02 |
| | | | | 60/338 |
| 2016/0169319 A1* | 6/2016 | Tsukano | ............... | F16F 15/145 |
| | | | | 188/378 |
| 2016/0281830 A1* | 9/2016 | Sekiguchi | ............... | F16H 45/02 |
| 2016/0327118 A1* | 11/2016 | Miyahara | .............. | F16F 15/145 |
| 2017/0159786 A1* | 6/2017 | Miyahara | ................ | F16H 45/02 |

FOREIGN PATENT DOCUMENTS

| | | |
|---|---|---|
| JP | 2015-102115 A | 6/2015 |
| WO | 2014/174563 A1 | 10/2014 |

\* cited by examiner

TORSIONAL VIBRATION REDUCTION DEVICE FOR TORQUE CONVERTER

INCORPORATION BY REFERENCE

The disclosure of Japanese Patent Application No. 2015-181243 filed on Sep. 14, 2015 including the specification, drawings and abstract is incorporated herein by reference in its entirety.

BACKGROUND

1. Technical Field

The present disclosure relates to the suppression of deformation of a torsional vibration reduction device that is provided inside a torque converter.

2. Description of Related Art

There are known torsional vibration reduction devices that are provided inside a torque converter, and have rolling elements that swing according to variation in torque, a plate in which rolling chambers swingably housing the rolling elements are formed, and a cover that shields the rolling elements and the plate from a working fluid inside the torque converter. One example is the torsional vibration reduction device of Japanese Patent Application Publication No. 2015-102115 (JP 2015-102115 A). In the torsional vibration reduction device of JP 2015-102115 A, when a torque variation occurs, the rolling elements swing inside the rolling chambers, and thus the energy of the torque variation is absorbed by the swinging of the rolling elements.

SUMMARY

In the torsional vibration reduction device of JP 2015-102115 A, a clearance in the axial direction of the torque converter is left between the plate and the cover. In the torsional vibration reduction device configured as described above, when the torque converter is driven to rotate around the axis, a load is applied to the cover by the oil pressure of the working fluid inside the torque converter. In this case, the cover may deform due to the clearance left between the plate and the cover.

The disclosed embodiments provide a structure that can suppress deformation of the cover of a torsional vibration reduction device provided inside a torque converter.

A torsional vibration reduction device configured to be provided inside a torque converter according to one aspect includes: rolling elements, a plate, and a cover. The plate includes rolling chambers corresponding in number to the rolling elements, each of the rolling chambers housing a corresponding one of the rolling elements. The rolling chambers are elongated in a circumferential direction of the plate so that each of the rolling elements housed in each of the rolling chambers is free to swing inside the rolling chambers by moving in the circumferential direction of the plate according to variation in torque applied to the torque converter. The cover encloses the rolling elements and the plate to shield the rolling elements and the plate from a working fluid that surrounds the torsional vibration reduction device inside the torque converter. The cover includes a first cover and a second cover. The first cover and the second cover are joined together with the plate held between the first cover and the second cover. The first cover and the second cover contact the plate in an axial direction of the torque converter at locations that are, with respect to an axis of the torque converter, on an inner peripheral side and on an outer peripheral side of the rolling chambers. Surfaces of the first cover and the second cover are joined to the plate at least at part of the locations where the first and second covers contact the plate.

According to the torsional vibration reduction device of this aspect, the surfaces of the first cover and the second cover are joined to the plate at least at part of the locations where the first and second covers contact the plate, so that the cover is fixed to the plate. Thus, no clearance is left between the cover and the plate, and deformation of the cover occurring when the torque converter is driven to rotate can be suppressed.

In the torsional vibration reduction device according to the above aspect, the surfaces of the first cover and the second cover are joined to the plate with welds.

According to the torsional vibration reduction device of this aspect, the surfaces of the first cover and the second cover in contact with the plate are partially welded together, so that the first cover and the second cover are fixed to the plate, and deformation of the cover occurring when the torque converter is driven to rotate can be suppressed. Moreover, since the surfaces of the cover and the plate in contact with each other are partially welded together, heat generated by the welding is hardly transferred to the rolling chambers of the plate, and heat deformation of wall surfaces of the rolling chambers can be suppressed.

In the torsional vibration reduction device according to the above aspect, the surfaces of the first cover and the second cover are joined to the plate with a weld that extends continuously in the circumferential direction of the plate.

According to the torsional vibration reduction device of this aspect, the surfaces of the first cover and the second cover are joined to the plate with a weld that extends continuously in the circumferential direction. Thus, the cover and the plate are firmly joined together, and deformation of the cover occurring when the torque converter is driven to rotate can be further suppressed.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

In the following, embodiments will be described in detail with reference to the drawings. In the following embodiments, the drawings are simplified or deformed as appropriate, and the dimensional ratios, the shapes, etc. of the parts are not necessarily accurately represented.

Figure 1:
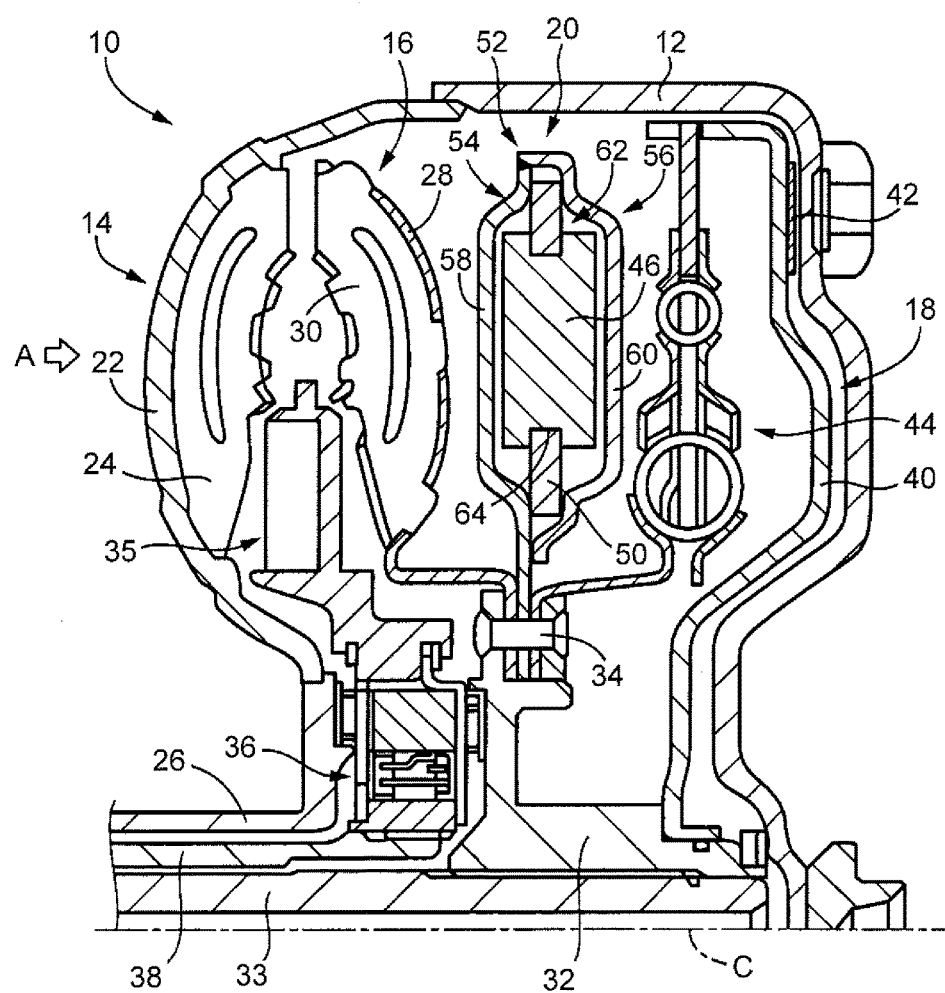
FIG. 1 is a sectional view of a torque converter to be loaded in a vehicle according to one embodiment.

FIG. 1 is a sectional view of a torque converter 10 to be included in a vehicle according to one embodiment. The torque converter 10 is a hydraulic power transmission device that is provided between an engine and a transmission (neither is shown) and serves to amplify the engine torque and transmit the torque to the transmission. The torque converter 10 is driven to rotate around an axis C as power is transmitted thereto from the engine.

The torque converter 10 includes a front cover 12 into which the power of the engine is input, a pump impeller 14 coupled to the front cover 12, a turbine runner 16 disposed so as to face the pump impeller 14 in the direction of the axis C, a lock-up clutch 18, and a torsional vibration reduction device 20 provided between the turbine runner 16 and the lock-up clutch 18 in the direction of the axis C.

The front cover 12 has a one-end-closed cylindrical shape, and is connected to a crankshaft (not shown) of the engine. The end of the front cover 12 on the open side is coupled to the outer peripheral end (end on the outer peripheral side with respect to the axis C) of the pump impeller 14. The pump impeller 14 is composed of an annular pump shell 22 having an arc-like sectional shape, and a plurality of pump blades 24 mounted on the pump shell 22. The outer peripheral end (end on the outer peripheral side with respect to the axis C) of the pump shell 22 is coupled by welding to the end of the front cover 12. The inner peripheral end (end on the inner peripheral side with respect to the axis C) of the pump shell 22 is connected to a first intermediate member 26. A working fluid is sealed inside a space surrounded by the front cover 12 and the pump shell 22. The first intermediate member 26 is coupled to a driving gear of an oil pump (not shown) so as to allow power transmission.

The turbine runner 16 is disposed at a position facing the pump impeller 14 in the direction of the axis C. The turbine runner 16 is composed of an annular turbine shell 28 having an arc-like sectional shape, and a plurality of turbine blades 30 mounted on the turbine shell 28. The inner periphery of the turbine shell 28 is connected to a clutch hub 32 with rivets 34. The inner periphery of the clutch hub 32 is connected to an input shaft 33 of the transmission by spline fitting so as to allow power transmission.

A stator 35 is disposed between the pump impeller 14 and the turbine runner 16 facing each other in the direction of the axis C. The inner periphery of the stator 35 is coupled to a case (not shown), which is a non-rotating member, through a one-way clutch 36 and a second intermediate member 38.

When the power of the engine is transmitted through the front cover 12 to the pump impeller 14 and the pump impeller 14 is driven to rotate, a fluid flow of the working fluid inside the torque converter 10 occurs, and as this fluid flow causes the turbine runner 16 to rotate, the power is transmitted. When the speed ratio between the pump impeller 14 and the turbine runner 16 is small, the flow direction of the working fluid flowing out of the turbine runner 16 is changed by the stator 35 and the working fluid is sent to the pump impeller 14. As a result, the pump impeller 14 is turned and the torque is amplified. When the speed ratio has become large, the stator 35 in turn prevents the flow of the working fluid. However, as the stator 35 rotates idly, disturbance in the flow of the working fluid due to the stator 35 is suppressed.

The lock-up clutch 18 is provided between the front cover 12 and the clutch hub 32 so as to allow power transmission. The lock-up clutch 18 includes a lock-up piston 40, and a friction material 42 fixed on the outer peripheral side of the lock-up piston 40. The lock-up piston 40 is installed at a position adjacent to the front cover 12 in the direction of the axis C. The inner peripheral end of the lock-up piston 40 is slidably fitted on the outer peripheral surface of a cylindrical part of the clutch hub 32. Thus, the lock-up piston 40 is configured to be movable in the direction of the axis C relative to the clutch hub 32. The friction material 42 is fixed on the outer peripheral side of the lock-up piston, more specifically, at a position at which the friction material 42 comes into contact with the front cover 12 when the lock-up piston 40 moves toward the front cover 12 in the direction of the axis C.

The outer periphery of the lock-up piston 40 is coupled to the clutch hub 32 through a torsional damper 44 so as to allow power transmission. The torsional damper 44 is a well-known vibration reduction device that reduces variation in engine torque transmitted from the front cover 12 through the lock-up clutch 18. The outer periphery of the lock-up piston 40 has a cylindrical shape, and a plurality of cutouts continuous in the circumferential direction are formed at the end of the lock-up piston 40. Protrusions that fit into the cutouts are formed at the outer peripheral end of the torsional damper 44. Thus, the torsional damper 44 is not rotatable relative to the lock-up piston 40 and is movable in the direction of the axis C relative to the lock-up piston 40.

The lock-up clutch 18 moves in the direction of the axis C according to a pressure difference between oil pressures acting on both sides of the lock-up piston 40 in the direction of the axis C. For example, if the oil pressure on the side of the front cover 12 of the lock-up piston 40 in the direction of the axis C is higher than the oil pressure on the side of the torsional damper 44 of the lock-up piston 40 in the direction of the axis C, the lock-up piston 40 is moved away from the front cover 12 in the direction of the axis C. In this case, the friction material 42 of the lock-up clutch 18 is not pressed against the front cover 12, so that the lock-up clutch 18 is released.

Conversely, if the oil pressure on the side of the torsional damper 44 of the lock-up piston 40 in the direction of the axis C is higher than the oil pressure on the side of the front cover 12 in the direction of the axis C, the lock-up piston 40 is moved toward the front cover 12 in the direction of the axis C. In this case, the friction material 42 of the lock-up clutch 18 is pressed against the front cover 12, so that a part or the whole of the power input into the front cover 12 is transmitted to the clutch hub 32 through the lock-up clutch 18 and the torsional damper 44. On the other hand, torque variations transmitted through the lock-up clutch 18 are reduced by the torsional damper 44.

Figure 2:
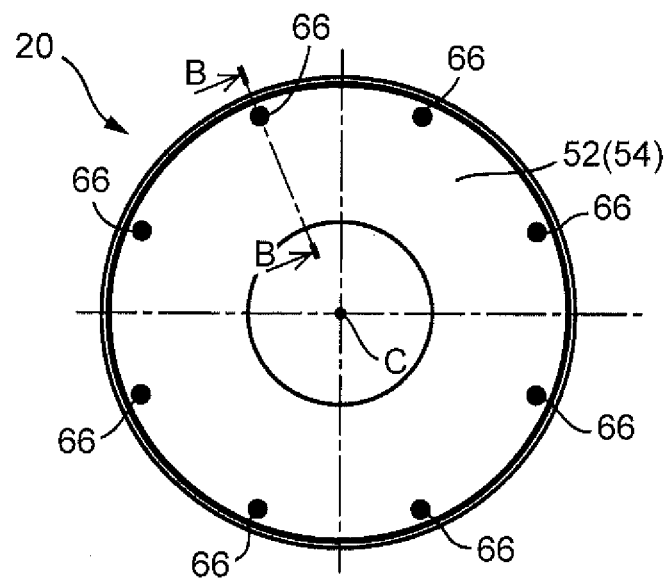
FIG. 2 is an external view of the torsional vibration reduction device of FIG. 1 as seen from the direction of the arrow A.
Figure 3:
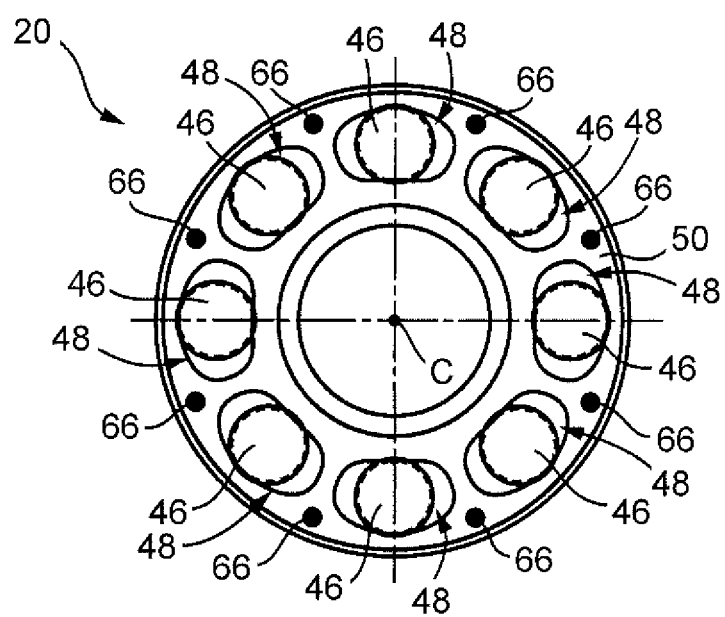
FIG. 3 is a view of the torsional vibration reduction device of FIG. 1, as seen from the direction of the arrow A, with a first cover removed.
Figure 4:
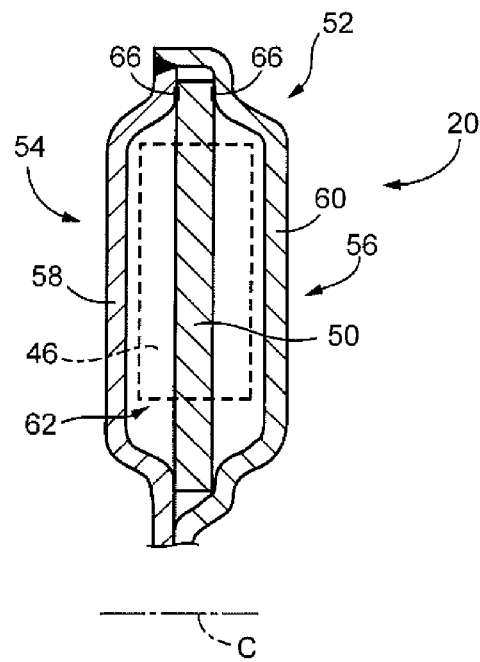
FIG. 4 is a sectional view of the torsional vibration reduction device of FIG. 2 cut along the line of cutting plane B.

The torsional vibration reduction device 20 is provided between the turbine runner 16 and the torsional damper 44 in the direction of the axis C. The torsional vibration reduction device 20 is provided inside the torque converter 10 in order to reduce variations in engine torque transmitted through the lock-up clutch 18 or torsional vibration of a rotating shaft (clutch hub 32, etc.). FIG. 2 is an external view of the torsional vibration reduction device 20 of FIG. 1 as seen from the direction of the arrow A, and FIG. 3 is a view of the torsional vibration reduction device 20 of FIG. 1, as seen from the direction of the arrow A, with a first cover 54 to be described later removed. FIG. 4 is a sectional view of the torsional vibration reduction device 20 of FIG. 2 cut along the line of cutting plane B.

The torsional vibration reduction device 20 includes a plurality of (in this embodiment, eight) rolling elements 46 disposed at equiangular intervals in the circumferential direction, a plate 50 in which rolling chambers 48 swingably housing the rolling elements are formed, and a cover 52 that houses the rolling elements 46 and the plate 50. The rolling elements 46, the plate 50, and the cover 52 are all made of a steel material.

The cover 52 is composed of the first cover 54 and a second cover 56 facing each other in the direction of the axis C. The inner periphery of the first cover 54 is fastened and fixed to the clutch hub 32 with the rivets 34.

The first cover 54 and the second cover 56 are oil-tightly joined together so as to house the rolling elements 46 and the plate 50. The first cover 54 has a disc-like shape, and has a protruding wall part 58 formed therein that bulges in a direction away from the second cover 56 when the first cover 54 is joined to the second cover 56. The second cover 56 has a disc-like shape, and has a protruding wall part 60 that bulges in a direction away from the protruding wall part 58 of the first cover 54 when the second cover 56 is joined to the first cover 54. Thus, when the first cover 54 and the second cover 56 are joined together, an annular space 62 is formed between the protruding wall part 58 and the protruding wall part 60, and the plate 50 and the rolling elements 46 are housed in the space 62. That is, the protruding wall parts 58, 60 are formed in the first cover 54 and the second cover 56 at positions overlapping the rolling elements 46 and (a part of) the plate 50 as seen from the direction of the axis C.

The outer peripheral end of the first cover 54 and the outer peripheral end of the second cover 56 are joined together by welding continuously in the circumferential direction. At the outer peripheral end of the second cover 56, a cylindrical part that extends toward the first cover 54 in the direction of the axis C is formed. With the inner peripheral surface of the cylindrical part of the second cover 56 and the outer peripheral end surface of the first cover 54 held in contact with each other, the second cover 56 and the first cover 54 are joined together by welding over the entire contact surfaces (entire circumference).

Moreover, the plate surface of the first cover 54 and the inner peripheral end of the second cover 56 are joined together by welding. The inner periphery of the second cover 56 is bent from the protruding wall part 60 toward the first cover 54 in the direction of the axis C, and the inner peripheral end of the second cover 56 is in contact with the first cover 54. These portions in contact with each other are joined together by welding along the entire circumference. Therefore, the working fluid inside the torque converter 10 is prevented from flowing into the space 62 surrounded by the first cover 54 and the second cover 56. That is, the cover 52 shields the rolling elements 46 and the plate 50 from the working fluid inside the torque converter 10.

The plate 50 has a circular plate-like shape. The outer peripheral end (outer peripheral side with respect to the axis C from positions at which the rolling elements 46 are housed) of the plate 50 is supported while being held between the first cover 54 and the second cover 56 in the direction of the axis C. The outer peripheral side of the first cover 54 from the protruding wall part 58 is bent toward the plate 50 so as to come into contact with the plate 50. The outer peripheral side of the second cover 56 from the protruding wall part 60 is bent toward the plate 50 so as to come into contact with the plate 50. Thus, the length in the direction of the axis C of the portion of the cover 52 in contact with the plate 50 on the outer peripheral side is shorter than the length in the direction of the axis C of the portion of the cover 52 where the protruding wall parts 58, 60 are formed.

The inner peripheral end (inner peripheral side with respect to the axis C from the positions at which the rolling elements 46 are housed) of the plate 50 is supported while being held between the first cover 54 and the second cover 56 in the direction of the axis C. The inner peripheral side of the first cover 54 from the protruding wall part 58 is bent toward the plate 50 so as to come into contact with the plate 50 in the direction of the axis C. The inner peripheral side of the second cover 56 from the protruding wall part 60 is bent toward the plate 50 so as to come into contact with the plate 50 in the direction of the axis C. Thus, the length in the direction of the axis C of the portion of the cover 52 in contact with the plate 50 on the inner peripheral side from the protruding wall parts 58, 60 is shorter than the length in the direction of the axis C of the portion of the cover 52 where the protruding wall parts 58, 60 are formed.

In the plate 50, the rolling chambers 48 that swingably house the rolling elements 46 are formed. The rolling chambers 48 are fan-shaped spaces formed in the plate 50, and the rolling elements 46 are located in these spaces. The rolling elements 46 are circular plate-like members having a larger thickness in the direction of the axis C than the plate 50, and a fitting groove 64 that fits with the wall surfaces of the rolling chamber 48 is formed in the outer peripheral surface of each rolling element 46. As the fitting groove 64 engages with the inner peripheral-side wall surface and the outer peripheral-side wall surface of the rolling chamber 48, the rolling element 46 can swing (move) in the circumferential direction along the wall surfaces of the rolling chamber 48. As the fitting groove 64 of the rolling element 46 fits with the wall surfaces of the rolling chamber 48, the rolling element 46 is prevented from falling out of the rolling chamber 48.

When a torque variation is transmitted to the torsional vibration reduction device 20, the rolling elements 46 housed in the rolling chambers 48 roll (swing) along the peripheral wall surfaces of the rolling chambers 48 according to the torque variation, and thus the vibration (torsional vibration) due to the torque variation is suppressed.

As described above, the outer peripheral end of the plate 50 is retained by being held between the first cover 54 and the second cover 56 in the direction of the axis C. However, depending on variation of the parts, a slight clearance may be left between the first and second covers 54, 56 and the plate 50. If such a clearance is left, the cover 52 deforms under the oil pressure inside the torque converter 10 when the torque converter 10 is driven to rotate, causing a large stress on the joint between the first cover 54 and the second cover 56. In this connection, if the joint breaks and the working fluid enters inside the cover 52, the swinging of the rolling elements 46 may be suppressed and the vibration reducing effect of the torsional vibration reduction device 20 may be diminished. One conceivable measure against such a situation is to increase the plate thickness of the first cover 54 and the second cover 56 so as to suppress deformation, which, however, adds to the weight of the torsional vibration reduction device.

To address this problem, in this embodiment, the contact surfaces of the plate 50 and the first and second covers 54, 56 in contact with each other in the direction of the axis C are connected to each other by welding at a plurality of points in the circumferential direction. The black spots in FIG. 2 and FIG. 3 indicate welded parts (locations) 66 at which the contact surfaces are partially joined together by projection welding. In this embodiment, the contact surfaces are partially joined together by projection welding at eight points (total 16 points on both surfaces of the plate 50) in the circumferential direction.

If contact surfaces 68 of the outer periphery of the plate 50 and the first and second covers 54, 56 in contact with each other in the direction of the axis C are thus partially joined together by welding, the first cover 54 and the second cover 56 are reliably fixed to the plate 50. Thus, no clearance in the direction of the axis C is left between the first and second covers 54, 56 and the plate 50, and deformation of the cover 52 occurring when the torque converter 10 is driven to rotate is suppressed.

Figure 5A:
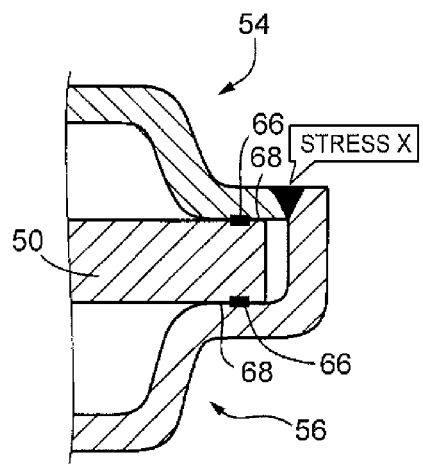
FIG. 5A shows results of an analysis of a stress that acts on a joint between the first cover and a second cover while the torque converter of FIG. 1 is being driven to rotate, in a case where projection welding is performed at 16 points in the circumferential direction between the plate and the first and second covers.
Figure 5B:
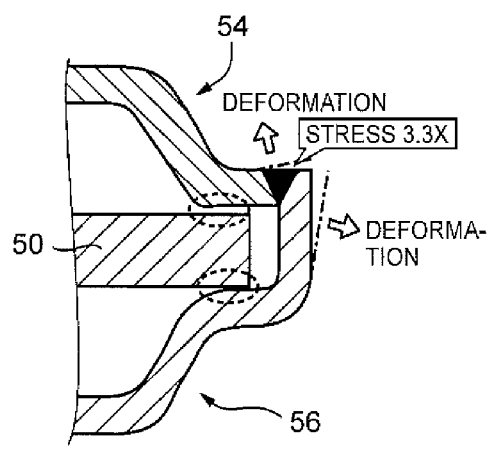
FIG. 5B shows results of an analysis of a stress that acts on the joint between the first cover and the second cover while the torque converter of FIG. 1 is being driven to rotate, in a case where a clearance is left between the plate and the first and second covers.

FIG. 5A and FIG. 5B show results of analyses in which a stress acting on the joint between the first cover 54 and the second cover 56 while the torque converter 10 was being driven was analytically calculated. FIG. 5A shows the results of the analysis in the case where projection welding was performed at 16 points in the circumferential direction between the plate 50 and the first and second covers 54, 56, and FIG. 5B shows the results of the analysis in the case where, for comparison, a clearance in the direction of the axis C was left between the plate 50 and the first and second covers 54, 56. The calculations were made on the assumption that an oil pressure of 2 MPa was applied to the outer periphery of the cover 52.

In this embodiment, as shown in FIG. 5A, since the plate 50 and the first and second covers 54, 56 are partially joined together by projection welding, the first cover 54 and the second cover 56 do not deform even when the torque converter 10 is driven to rotate. By contrast, in FIG. 5B, due to the clearance in the direction of the axis C left between the plate 50 and the first and second covers 54, 56, the first cover 54 and the second cover 56 are deformed as indicated by the dot-and-dash lines when the torque converter 10 is driven to rotate. In this connection, when the value of the stress applied to the joint (welded part) between the first cover 54 and the second cover 56 in FIG. 5A is X, the value of the stress applied to the joint (welded part) between the first cover 54 and the second cover 56 in FIG. 5B is about 3.3×. That is, in this embodiment, compared with the case where projection welding is not performed, the stress applied to the joint between the first cover 54 and the second cover 56 is significantly reduced. Since the stress applied to the joint is thus significantly reduced, the pressure capacity of the cover 52 is improved.

As described above, according to this embodiment, the first and second covers 54, 56 of the cover 52 and the plate 50 are joined together, so that the first cover 54 and the second cover 56 are fixed to the plate 50. Thus, no clearance in the direction of the axis C is left between the cover 52 and the plate 50, and deformation of the cover 52 occurring when the torque converter 10 is driven to rotate can be suppressed.

Moreover, according to this embodiment, the contact surfaces 68 of the cover 52 and the plate 50 in contact with each other in the direction of the axis C are partially welded together. Thus, heat produced during the welding is hardly transferred to the rolling chambers 48 of the plate 50, and heat deformation of the wall surfaces of the rolling chambers 48 can be suppressed.

Next, other embodiments will be described. In the following description, the parts that are the same as in the above embodiment will be denoted by the same reference signs and description thereof will be omitted.

Embodiment 2

Figure 6:
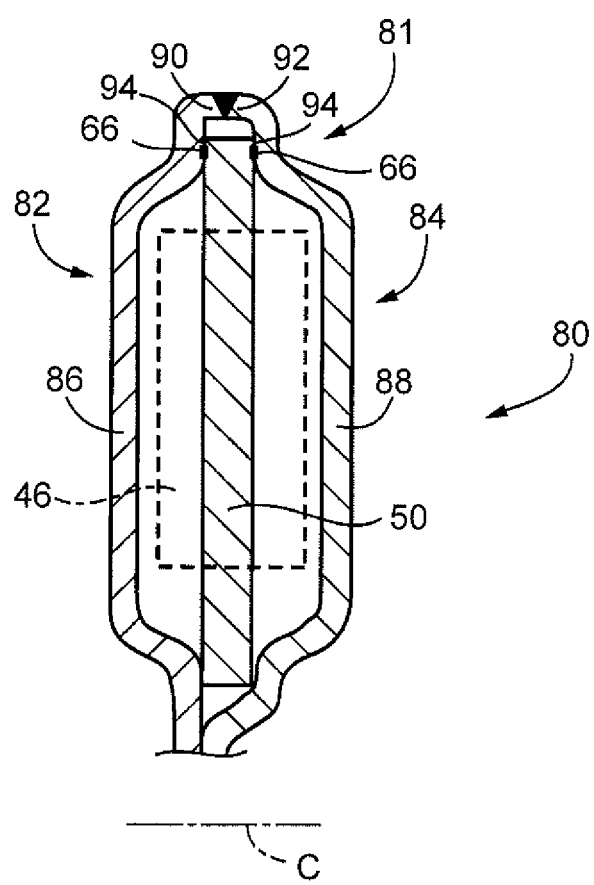
FIG. 6 is a sectional view of a torsional vibration reduction device according to another embodiment.

FIG. 6 is a sectional view of a torsional vibration reduction device 80 according to another embodiment, and is a view corresponding to FIG. 4 of the above embodiment. When the torsional vibration reduction device 80 of this embodiment and the torsional vibration reduction device 20 of the above embodiment are compared, the position of the joint between the first cover and the second cover is different. The structure of the cover different from that of the above embodiment will be mainly described below.

A cover 81 of the torsional vibration reduction device 80 is composed of a first cover 82 and a second cover 84. The first cover 82 has a protruding wall part 86 formed therein that bulges away from the second cover 84 in the direction of the axis C when the first cover 82 is joined to the second cover 84. The second cover 84 has a protruding wall part 88 formed therein that bulges away from the first cover 82 in the direction of the axis C when the second cover 84 is joined to the first cover 82. The plate 50 and the rolling elements 46 are housed in an annular space formed by the protruding wall parts 86, 88.

The outer periphery of the first cover 82 is bent toward the plate 50 so as to come into contact with the plate 50 in the direction of the axis C. Similarly, the outer periphery of the second cover 84 is bent toward the plate 50 so as to come into contact with the plate 50 in the direction of the axis C. Accordingly, the outer peripheral end of the plate 50 (end of the plate 50 on the outer peripheral side from the positions at which the rolling elements 46 are housed) is supported while being held between the first cover 82 and the second cover 84 in the direction of the axis C.

Contact surfaces 94 of the first and second covers 82, 84 and the plate 50 in contact with each other in the direction of the axis C are partially joined together by projection welding at a plurality of points in the circumferential direction. Accordingly, the first cover 82 and the second cover 84 are fixed to the plate 50, so that no clearance in the direction of the axis C is left between the first and second covers 82, 84 and the plate 50, and deformation of the first cover 82 and the second cover 84 occurring when the torque converter 10 is driven to rotate is suppressed.

An annular jutted portion 90 extending toward the second cover 84 is formed at the outer peripheral end of the first cover 82. An annular jutted portion 92 extending toward the first cover 82 is formed at the outer peripheral end of the second cover 84. With the end surface of the jutted portion 90 and the end surface of the jutted portion 92 butted against each other, the periphery of the cover (side surfaces in the radial direction of the cover) are joined together by welding continuously along the butted surfaces.

In the above case, too, where the end surface of the jutted portion 90 of the first cover 82 and the end surface of the jutted portion 92 of the second cover 84 are joined together by welding, the first cover 82 and the second cover 84 are partially welded to the plate 50 by projection welding. Thus, deformation of the first cover 82 and the second cover 84 is suppressed and the stress applied to the joint (welded part) between the first cover 82 and the second cover 84 is reduced, so that the pressure capacity of the cover 81 is improved.

As described above, the torsional vibration reduction device 80 of this embodiment can produce the same effects as the device of the above embodiment.

Embodiment 3

Figure 7:
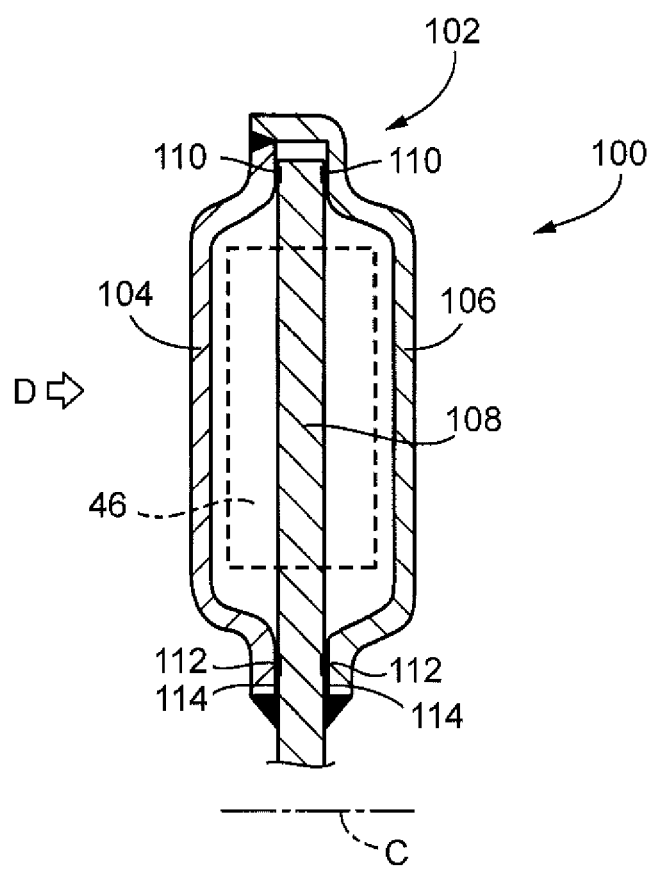
FIG. 7 is a sectional view of a torsional vibration reduction device according to yet another embodiment.

FIG. 7 is a sectional view of a torsional vibration reduction device 100 according to yet another embodiment. In the torsional vibration reduction device 100 of this embodiment, the inner peripheral side of the cover is joined to the plate by welding. The structure of the cover on the inner peripheral side different from that of the above embodiments will be mainly described below.

As shown in FIG. 7, a cover 102 of the torsional vibration reduction device 100 is composed of a first cover 104 and a second cover 106. The outer peripheral side (outer peripheral side with respect to the axis C) of the first cover 104 is bent so as to come into contact with a plate 108. Similarly, the outer peripheral side of the second cover 106 is bent so as to come into contact with the plate 108.

Figure 8:
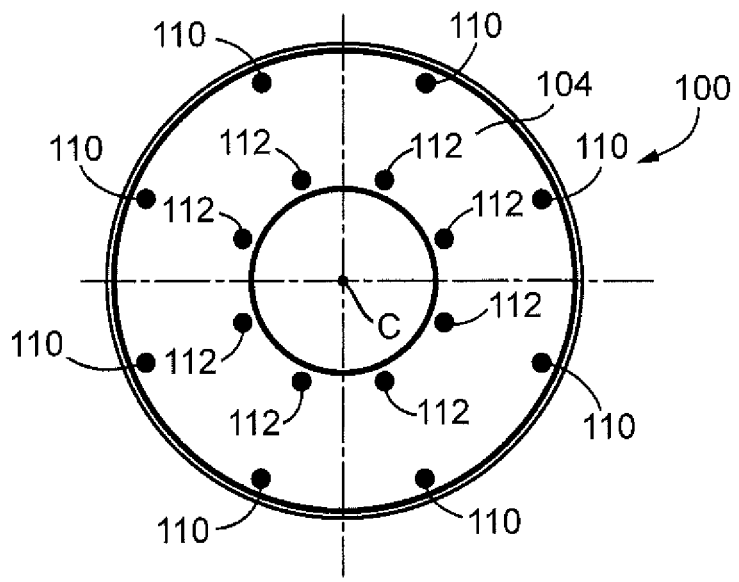
FIG. 8 is an external view of the torsional vibration reduction device of FIG. 7 as seen from the direction of the arrow D.
Figure 9:
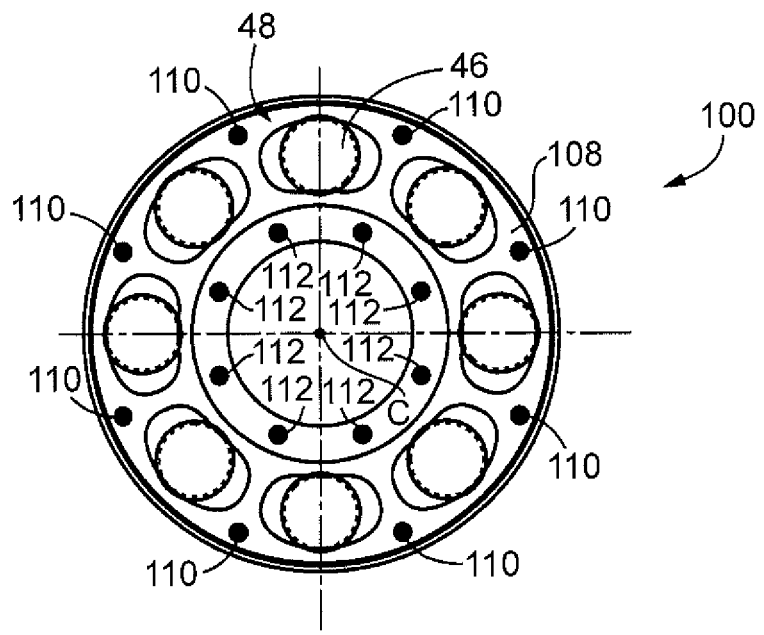
FIG. 9 is a view of the torsional vibration reduction device of FIG. 7, as seen from the direction of the arrow D, with the first cover removed.

FIG. 8 is an external view of the torsional vibration reduction device 100 of FIG. 7 as seen from the direction of the arrow D, and FIG. 9 is a view of the torsional vibration reduction device of FIG. 7, as seen from the direction of the arrow D, with the first cover 104 removed. As shown in FIG. 7 and FIG. 8, the outer periphery of the first cover 104 and the outer periphery of the second cover 106 are joined together by welding continuously in the circumferential direction. Moreover, welded parts 110 at which the contact surfaces are partially joined together by projection welding are formed between the outer periphery of the plate 108 and the first and second covers 104, 106.

The inner peripheral end of the first cover 104 is bent so as to come into contact with the plate surface of the plate 108, and the inner peripheral end of the first cover 104 is joined to the plate 108 by welding continuously in the circumferential direction. Similarly, the inner peripheral end of the second cover 106 is bent so as to come into contact with the plate surface of the plate 108, and the inner peripheral end of the second cover 106 is joined to the plate 108 by welding continuously in the circumferential direction. The inner periphery of the plate 108 is fastened and fixed to the clutch hub with rivets etc.

The plate 108 is in contact with the first cover 104 and the second cover 106 so as to be held therebetween on the outer peripheral side with respect to the axis C from the welded parts between the plate 108 and the inner peripheries of the first and second covers 104, 106, that is the inner peripheral side with respect to the axis C from the positions in the plate 108 at which the rolling elements 46 are housed. However, depending on variation of the parts, a clearance in the direction of the axis C may be left between the contact surfaces of the plate 108 and the first and second covers 104, 106, and the first cover 104 and the second cover 106 may deform due to the clearance. To eliminate this possibility, in this embodiment, welded parts 112 at which the plate 108 and the first and second covers 104, 106 are partially joined together by projection welding are formed on contact surfaces 114 of the plate 108 and the inner peripheries of the first and second covers 104, 106 in contact with each other.

In FIG. 8 and FIG. 9, the black spots indicate the welded parts 110, 112 at which projection welding is performed. As shown in FIG. 8 and FIG. 9, the welded parts 110, 112 at which the contact surfaces are joined together by projection welding at eight points in the circumferential direction are formed on the outer peripheral side and the inner peripheral side of the first cover 104 and the second cover 106. As the welded parts 112 are thus formed on the inner peripheral side of the first cover 104 and the second cover 106 as well, no clearance in the direction of the axis C due to variation of the parts is left between the contact surfaces 114 of the plate 108 and the inner peripheries of the first and second covers 104, 106 in contact with each other, so that deformation of the first cover 104 and the second cover 106 occurring while the torque converter 10 is driven to rotate is suppressed. Thus, the stress applied to the portions of the plate 108 and the first and second covers 104, 106 welded together in the circumferential direction is reduced.

As described above, according to this embodiment, the contact surfaces 114 of the inner peripheries of the first and second covers 104, 106 and the plate 108 in contact with each other are also partially joined together by welding, so that deformation of the inner periphery of the first cover 104 and the inner periphery of the second cover 106 occurring when the torque converter 10 is driven to rotate is suppressed. Thus, the stress applied to the joint between the inner peripheral ends of the first and second covers 104, 106 and the plate 108 is reduced, and the pressure capacity of the cover 102 is improved.

Embodiment 4

Figure 10:
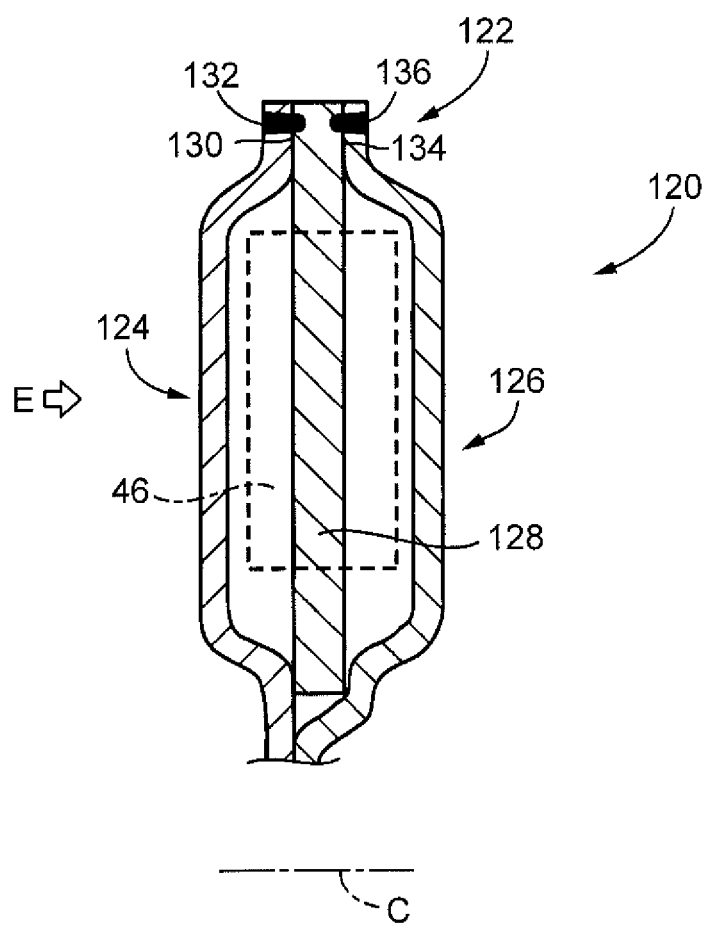
FIG. 10 is a sectional view of a torsional vibration reduction device according to still another embodiment.

FIG. 10 is a sectional view of a torsional vibration reduction device 120 according to still another embodiment. When the torsional vibration reduction device 120 of this embodiment is compared with the torsional vibration reduction device 20 of the above embodiment, the two are different from each other in that the surfaces of the cover and the plate in contact with each other are joined together continuously in the circumferential direction in the torsional vibration reduction device 120. The joint between the cover and the plate different from that of the above embodiments will be mainly described below.

As shown in FIG. 10, a cover 122 of the torsional vibration reduction device 120 is composed of a first cover 124 and a second cover 126. The outer periphery (radially outer side with respect to the axis C) of the first cover 124 is bent toward a plate 128 so as to come into contact with the plate 128, and thus the outer periphery is in contact with the plate surface of the plate 128. The outer periphery (radially outer side with respect to the axis C) of the second cover 126 is bent toward the plate 128 so as to come into contact with the plate 128, and thus the outer periphery is in contact with the plate surface of the plate 128.

Figure 11:
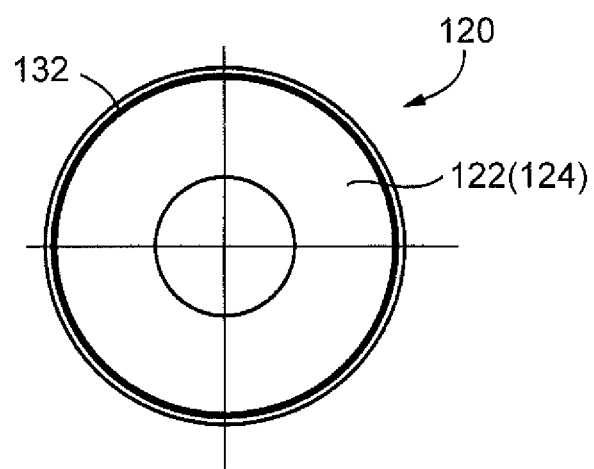
FIG. 11 is an external view of the torsional vibration reduction device of FIG. 10 as seen from the direction of the arrow E.

FIG. 11 is an external view of the torsional vibration reduction device 120 of FIG. 10 as seen from the direction of the arrow E. As shown in FIG. 10 and FIG. 11, a welded part 132 (linear joint) at which contact surfaces 130 of the first cover 124 and the plate 128 are joined together, for example, by laser welding continuously in the circumferential direction is formed in the contact surfaces 130. Similarly, a welded part 136 (linear joint) at which contact surfaces 134 of the second cover 126 and the plate 128 are joined together, for example, by laser welding continuously in the circumferential direction is formed in the contact surfaces 134.

As described above, the contact surfaces 130, 134 of the plate 128 and the first and second covers 124, 126 are continuously joined (linearly joined) together by welding, so that the gap between the plate 128 and the first and second covers 124, 126 is sealed, and the plate 128 and the rolling elements 46 are shielded from the working fluid by the cover 122. Since the contact surfaces 130, 134 of the plate 128 and the first and second covers 124, 126 are welded together, a clearance in the direction of the axis C is prevented from being left at the contact surfaces 130, 134. Thus, deformation of the first cover 124 and the second cover 126 occurring while the torque converter 10 is driven is suppressed, and the pressure capacity of the cover 122 is improved.

As described above, according to the torsional vibration reduction device 120 of this embodiment, the contact surfaces 130, 134 of the plate 128 and the first and second covers 124, 126 are continuously joined (linearly joined) together by welding in the circumferential direction. Thus, no clearance in the direction of the axis C is left between the plate 128 and the first and second covers 124, 126, and deformation of the first cover 124 and the second cover 126 occurring while the torque converter 10 is driven to rotate is suppressed. Moreover, since the plate 128 and the first and second covers 124, 126 are firmly joined together, deformation of the cover 122 occurring when the torque converter 10 is driven to rotate can be further suppressed.

While the embodiments have been described in detail on the basis of the drawings, other aspects are also applicable.

For example, in all the above embodiments, the plate and the first and second covers are joined together by welding. However, the joining method is not limited to welding. The joining method can be appropriately changed, for example, to brazing, caulking, etc., as long as the plate and the first and second covers can be joined together.

In the torsional vibration reduction device 100 of the above embodiment, the contact surfaces of the plate 108 and the cover 102 in contact with each other on the inner peripheral side and the outer peripheral side from the positions at which the rolling elements 46 are housed are welded together. Alternatively, only the contact surfaces 114 of the plate 108 and the cover 102 in contact with each other on the inner peripheral side from the positions at which the rolling elements 46 are housed may be welded together.

The above embodiments are mere examples, various modifications and improvements made thereto on the basis of the knowledge of those skilled in the art can also be implemented.

What is claimed is:

1. A torsional vibration reduction device configured to be provided inside a torque converter, the torsional vibration reduction device comprising:
    rolling elements;
    a plate having oppositely-facing surfaces and including rolling chambers corresponding in number to the rolling elements, the rolling chambers disposed around an axis that extends in a direction perpendicular to the oppositely-facing surfaces of the plate, each of the rolling chambers housing a corresponding one of the rolling elements, the rolling chambers being elongated in a circumferential direction of the plate so that each of the rolling elements housed in each of the rolling chambers is free to swing inside the rolling chambers by moving in the circumferential direction of the plate; and
    a cover that encloses the rolling elements and the plate, the cover configured to shield the rolling elements and the plate from a working fluid that surrounds the torsional vibration reduction device when the torsional vibration reduction device is mounted inside the torque converter, the cover including a first cover and a second cover, the first cover and the second cover being joined together with the plate held between the first cover and the second cover, the first cover and the second cover contacting the plate on the oppositely-facing surfaces of the plate at locations that are, with respect to the axis, on an inner peripheral side and on an outer peripheral side of the rolling chambers, surfaces of the first cover and the second cover being joined to the plate at least at part of the locations where the first and second covers contact the plate,
    wherein the surfaces of the first cover and the second cover are joined to the plate with welds.

2. The torsional vibration reduction device according to claim 1, wherein the surfaces of the first cover and the second cover are joined to the plate at least at part of the locations where the first and second covers contact the plate on the inner peripheral side of the rolling chambers.

3. The torsional vibration reduction device according to claim 2, wherein the surfaces of the first cover and the second cover are joined to the plate at least at part of the locations where the first and second covers contact the plate on the outer peripheral side of the rolling chambers.

4. The torsional vibration reduction device according to claim 1, wherein the surfaces of the first cover and the second cover are joined to the plate at least at part of the locations where the first and second covers contact the plate on the outer peripheral side of the rolling chambers.

5. A torsional vibration reduction device configured to be provided inside a torque converter, the torsional vibration reduction device comprising:
    rolling elements;
    a plate having oppositely-facing surfaces and including rolling chambers corresponding in number to the rolling elements, the rolling chambers disposed around an axis that extends in a direction perpendicular to the oppositely-facing surfaces of the plate, each of the rolling chambers housing a corresponding one of the rolling elements, the rolling chambers being elongated in a circumferential direction of the plate so that each of the rolling elements housed in each of the rolling chambers is free to swing inside the rolling chambers by moving in the circumferential direction of the plate; and
    a cover that encloses the rolling elements and the plate, the cover configured to shield the rolling elements and the plate from a working fluid that surrounds the torsional vibration reduction device when the torsional vibration reduction device is mounted inside the torque converter, the cover including a first cover and a second cover, the first cover and the second cover being joined together with the plate held between the first cover and the second cover, the first cover and the second cover contacting the plate on the oppositely-facing surfaces of the plate at locations that are, with respect to the axis, on an inner peripheral side and on an outer peripheral side of the rolling chambers, surfaces of the first cover and the second cover being joined to the plate at least at part of the locations where the first and second covers contact the plate, wherein the surfaces of the first cover and the second cover are joined to the plate with a weld that extends continuously in the circumferential direction of the plate.

6. The torsional vibration reduction device according to claim 5, wherein the weld that extends continuously in the circumferential direction of the plate forms a fluid-tight seal.

* * * * *